United States Patent
Ohno et al.

Patent Number: 5,667,872
Date of Patent: Sep. 16, 1997

[54] SYNTHETIC PAPER WITH MULTI-LAYER STRUCTURE AND EXCELLENT PRINTING PROPERTY

[75] Inventors: Akihiko Ohno; Atsushi Ishige; Hiroshi Koyama; Koichi Asami, all of Ibaraki, Japan

[73] Assignee: Oji Yuka Goseishi Co., Ltd., Tokyo, Japan

[21] Appl. No.: 395,835

[22] Filed: Feb. 28, 1995

[30] Foreign Application Priority Data

May 30, 1994 [JP] Japan ................................. 6-137817

[51] Int. Cl.$^6$ ........................................ B32B 27/32
[52] U.S. Cl. ........................... 428/141; 428/143; 428/144; 428/407; 428/317.9; 428/515; 428/516
[58] Field of Search ........................ 428/323, 330, 428/537.5, 537.1, 338, 332, 339, 317.9, 317.3, 316.6, 315.9, 315.7, 515, 516, 314.8, 318.4, 319.3, 407, 141, 142, 143, 144

[56] References Cited

U.S. PATENT DOCUMENTS

| | | | |
|---|---|---|---|
| 3,922,427 | 11/1975 | Toyoda et al. | 428/308 |
| 4,318,950 | 3/1982 | Takashi et al. | 428/143 |
| 4,971,950 | 11/1990 | Kato et al. | 503/227 |
| 4,986,866 | 1/1991 | Ohba et al. | 156/220 |
| 5,091,236 | 2/1992 | Keller et al. | 428/213 |
| 5,108,834 | 4/1992 | Asazuma | 428/323 |
| 5,332,542 | 7/1994 | Yamanaka et al. | 264/509 |

FOREIGN PATENT DOCUMENTS

| | | |
|---|---|---|
| 0044544 | 1/1982 | European Pat. Off. |
| 0511562 | 4/1992 | European Pat. Off. |
| 0521479 | 7/1993 | European Pat. Off. |
| 56141339 | 11/1981 | Japan. |
| 5169806 | 7/1993 | Japan. |
| 2177049 | 1/1987 | United Kingdom. |

*Primary Examiner*—Paul J. Thibodeau
*Assistant Examiner*—D. Lawrence Tarozano
*Attorney, Agent, or Firm*—Sughrue, Mion, Zinn, Macpeak & Seas

[57] ABSTRACT

A synthetic paper with a multi-layer structure comprising a biaxially stretched film of an olefinic polymer having a melting point (the peak temperature of the DSC curve) of from 130° C. to 210° C. containing from 5 to 40% by weight inorganic fine powders having a mean particle size of from 0.01 to 10 μm as a base material layer (A) having adhered to at least one surface thereof a uniaxially stretched layer (B) having a surface roughness of from 0.3 to 1.5 μm, with the uniaxially stretched layer (B) comprising a propylene α-olefin copolymer or a high-density polyethylene having a melting point (the peak temperature of the DSC curve) of from 120° C. to 160° C. which is at least 5° C. lower than the melting point of the olefinic polymer of the base material layer (A) and from 8 to 65% by weight inorganic fine powders having a mean particle size of from 0.01 to 5 μm, wherein the surfaces of the inorganic fine powders contained in the uniaxially stretched layer (B) are coated with the propylene α-olefin copolymer or the high-density polyethylene.

9 Claims, 4 Drawing Sheets

SYNTHETIC PAPER WITH MULTI-LAYER STRUCTURE AND EXCELLENT PRINTING PROPERTY

FIELD OF THE INVENTION

The present invention relates to a synthetic paper with a multi-layer structure, having an excellent printing property, showing quick drying of an offset printing ink, and giving less paper powder trouble.

The synthetic paper is useful as a material for poster papers, packaging papers, label papers, etc.

BACKGROUND OF THE INVENTION

A synthetic paper composed of a biaxially stretched polypropylene film containing from 5 to 40% by weight inorganic fine powders as a base material layer in place of a paper made of a natural pulp and a uniaxially stretched polypropylene film containing from 8 to 65% by weight inorganic fine powders laminated onto both surfaces of the base material layer as a paper-like layer is proposed and practically used (see, U.S. Pat. No. 4,318,950, JP-B-46-40794, JP-B-60-36173, JP-B-62-35412, etc., (the term "JP-B" as used herein means an "examined published Japanese patent application")).

Since the synthetic paper with the laminated layer structure has many microvoids around inorganic fine powders as the nuclei and has long cracks at the surfaces thereof, a part of the inorganic fine powders which become the nuclei of the microvoids and surface cracks project from the surface (see FIG. 3), the inorganic fine powders are liable to fall off (so-called paper powder trouble) from the surface layers, the inorganic fine powders that fall off stain a blanket barrel and intermix with a printing ink at offset printing to lower the continuous printing property, and are also the cause of dust in a computer room or a drawing room using CAD, which is undesirable.

Also, when adhesive tape, which is stuck to the printed surface of the synthetic paper, is released, if the surface strength of the paper is weakened, the printing ink is peeled off. Thus, such a synthetic paper is unsuitable as a sheet for a roll-form delayed label (heat-sensitive pressure-sensitive adhesive type label) without need of a released paper.

Furthermore, when using synthetic paper, ink drying at offset printing is not complete and further quick drying has been desired.

For preventing the occurrence of the paper powder trouble, a high glassy synthetic paper composed of a paper-like layer containing inorganic fine powders and a resin film layer containing no inorganic fine powders or containing a very small amount (not more than 3% by weight) of inorganic fine powders, if any, formed on the surface of the paper-like layer as described in U.S. Pat. No. 4,663,216 and a synthetic paper composed of a stretched polyolefin film (a) containing from 10 to 40% by weight inorganic fine powders and a stretched polyolefin film (b) containing no inorganic fine powders laminated on one surface, which becomes a printing surface side, (the thickness of the layer (a)/the thickness of the layer (b) is at least 4) as described in JP-B-3-44909 are proposed.

These synthetic papers are excellent in preventing the occurrence of the paper powder trouble and in surface strength but have the disadvantages that the pencil writing property is poor and drying of an offset printing ink is delayed.

Furthermore, a synthetic paper with a multi-layer resin structure composed of a biaxially stretched thermoplastic resin film as a base material layer (1a), having laminated on at least one surface thereof a laminate composed of a uniaxially stretched thermoplastic resin film containing from 8 to 65% by weight inorganic fine powders as a paper-like layer (1b) (in addition, the paper-like layer contains at least 2% by weight inorganic fine powders having a specific area of at least 100 m²/g) and a uniaxially stretched styrene-polypropylene copolymer film having a thickness of from 0.15 to 2 μm as a surface layer (1c), wherein the thickness (t) of the surface layer (1c) satisfies the following equation (1) when a mean particle size of the inorganic fine powders existing in the paper-like layer (1b) is defined (R);

$$R \geq t \geq \frac{1}{10} \times R \tag{1}$$

as described in U.S. Pat. 4,705,719 is proposed.

However, the foregoing synthetic paper is good in the surface strength, the pencil writing property, preventing an occurrence of the paper powder trouble and the gravure printing property but the drying property of the offset printing ink is insufficient.

SUMMARY OF THE INVENTION

The object of the present invention is to provide a synthetic paper which has an excellent surface strength, printing property and pencil writing property, shows fast drying of an offset printing ink, and gives less paper powder trouble and less paper feeding trouble.

That is, it has now been discovered that the object described above can be achieved by the present invention as described hereinbelow.

According to the present invention, there is provided a synthetic paper with a multi-layer structure comprising a biaxially stretched film of an olefinic polymer having a melting point (the peak temperature of the DSC curve) of from 130° C. to 210° C. containing from 5 to 40% by weight inorganic fine powders having a mean particle size of from 0.01 to 10 μm as a base material layer (A) having adhered to at least one surface thereof a uniaxially stretched layer (B) having a surface roughness of from 0.3 to 1.5 μm, with the uniaxially stretched layer (B) comprising a propylene series polymer or a high-density polyethylene having a melting point (the peak temperature of the DSC curve) of from 120° C. to 160° C. which is at least 5° C. lower than the melting point of the olefinic polymer of the base material layer (A) and from 8 to 65% by weight inorganic fine powders having a mean particle size of from 0.01 to 5 μm, wherein the surfaces of the inorganic fine powders contained in the uniaxially stretched layer (B) are coated with the propylene series copolymer or the high-density polyethylene.

In the present invention, the surfaces of the inorganic fine powders in the uniaxially stretched layer (B) forming the surface of the synthetic paper are coated with a resin, the occurrence of the paper powder trouble is prevented, the drying property of an offset ink is quick due to the roughness of the surface, and writing by pencil is possible due to the roughness of the uniaxially stretched layer (B).

BRIEF DESCRIPTION OF THE DRAWINGS

In FIGS. 1 and 3, A represents a base material layer, B represents a surface layer, 1 and 2 each represents an inorganic fine powder, 1' represents a huge particle, and 1" represents an aggregated macro-particle.

DETAILED DESCRIPTION OF THE INVENTION

Figure 1:
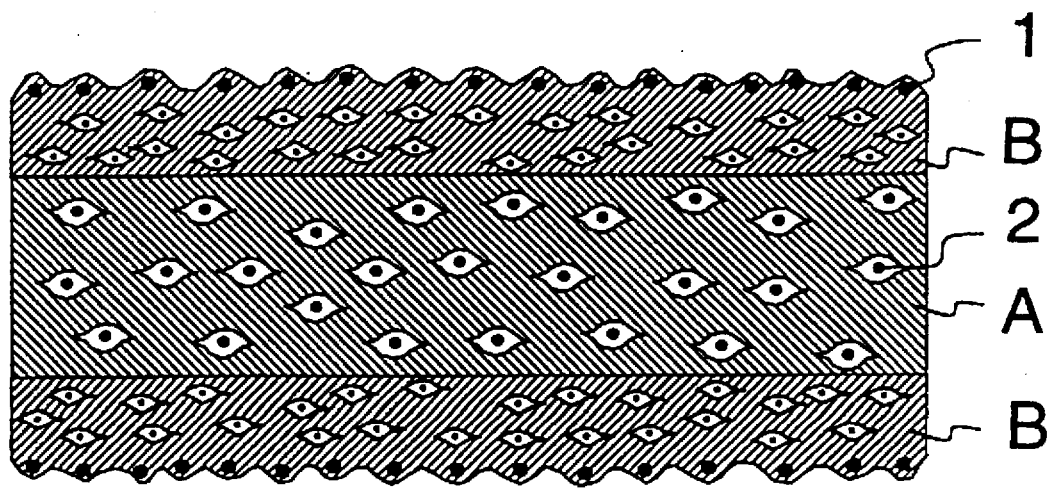
FIG. 1 is a magnified schematic cross sectional view of an embodiment of the synthetic paper of the present invention.

Now, the present invention is described in detail.

(Base Material Layer)

The base material layer (A) of the synthetic paper with a multi-layer structure of the present invention is a biaxially stretched layer of an olefinic polymer film having a melting point (the peak temperature of the DSC curve) of preferably from 130° C. to 210° C. containing from 5 to 40% by weight, and preferably from 10 to 35% by weight inorganic fine powders having a mean particle size of from 0.01 to 10 μm, and preferably from 0.05 to 8 μm. Since this layer is a biaxially stretched film of an olefinic polymer containing microvoids formed by biaxially stretching in a large amount of from 5 to 55% in a void ratio shown by the following equation (2), the layer contributes to reduce the weight of the synthetic paper.

$$\text{Void ratio (\%)} = (\rho_o - \rho)/\rho_o \times 100 \quad (2)$$

$\rho_o$: The density of the film before stretching
$\rho$: The density of the film after stretching As the inorganic fine powders to be compounded with the base material layer, the fine powders of calcium carbonate, titanium oxide, calcined clay, diatomaceous earth, talc, barium sulfate, aluminum sulfate, and silica can be used.

As the olefinic polymer for the base material layer, a propylene homopolymer, poly(4-methylpentene-1), a propylene-ethylene copolymer, a propylene-(4-methylpentene-1) copolymer, etc., can be used. Of these polymers, a propylene homopolymer having a melting point (the peak temperature of the DSC curve) of from 160° C. to 174° C., a melt index (JIS K7210) of from 0.5 to 10 g/10 minutes, and a crystallinity of from 35 to 70% is preferably used.

The thickness of the base material layer is from 20 to 200 μm, and preferably from 30 to 150 μm.

(Surface Layer)

The surface layer is a uniaxially stretched film of a polypropylene copolymer or a high-density polyethylene (density: 0.945 to 0.970 g/cm³) having a melting point (the peak temperature of the DSC curve) of from 120° C. to 160° C. and a melting point of at least 5° C. lower than the melting point of the olefinic polymer constituting the base material layer and containing from 8 to 65% by weight, and preferably from 15 to 55% by weight inorganic fine powders having a mean particle size of from 0.01 to 5 μm, and preferably from 0.05 to 3 μm, the surface of the inorganic fine powders are coated with a propylene series copolymer or a high-density polyethylene forming a matrix, and the surface roughness Ra (JIS B0602) thereof is from 0.3 to 1.5 μm.

If the surface roughness is less than 0.3 μm, the smoothness of the surface is increased, which results in causing the problems that the drying property of the ink is lowered and when the synthetic papers are piled up, a set-off phenomenon occurs. Also, if the surface roughness is over 1.5 μm, the unevenness of the surface is too large, which causes a gas generated from the ink after printing to accumulate in the concaved portions of the uneven surface so that when the surface is printed (back printing), a so-called ghost (the paint on the front surface of the paper is seen on the back surface of the paper) is liable to occur.

A smoothness (Bekk index) of the surface (JIS P8119) of the uniaxially stretched layer (B) is preferably less than 500 seconds and a gloss (JIS P8142; angle: 75°) thereof is preferably less than 20%.

As the inorganic fine powders, calcium carbonate, titanium oxide, calcined clay, diatomaceous earth, talc, barium sulfate, aluminum sulfate, silica, etc., having a mean particle size of from 0.01 to 10 μm can be used. Also, as the propylene series copolymer, a copolymer of propylene as the main component and at least one kind of α-olefin selected from ethylene, butene-1, hexene-1, pentene-1, 4-methylpentene-1, and 3-methylpentene-1 can be used. The copolymer may be of a random type or a block type.

The thickness of the uniaxially stretched layer is most suitably from 2 to 60 μm, especially preferably from 2 to 5 μm.

Also, for imparting a paper-like feeling to the uniaxiallly stretched layer as the surface layer, a uniaxially stretched layer of a propylene series resin containing from 8 to 55% by weight of an inorganic fine powder may exist between the foregoing uniaxially stretched layer (B) and the base material layer (A).

As the propylene series resin for the uniaxially stretched layer which exists between the uniaxially stretched layer (B) and the base material layer (A) for imparting a paper-like feeling to the uniaxially stretched layer (B), a propylene homopolymer, a propylene-ethylene copolymer, a propylene-(4-methylpentene-1) copolymer, etc., can be used.

As the inorganic fine powders to be compounded with the uniaxially stretched layer which exists between the uniaxially stretched layer (B) and the base material layer (A) for imparting a paper-like feeling to the uniaxially stretched layer (B), the fine powders of calcium carbonate, titanium oxide, calcined clay, diatomaceous earth, talc, barium sulfate, aluminum sulfate, and silica can be used.

Furthermore, the base material layer (A) may further contain less than 30% by weight of a low-melting resin such as a propylene series copolymer, high-density polyethylene, polystyrene, an ethylene-vinyl acetate copolymer, etc., for improving the stretching property.

(Production of Synthetic Paper)

The synthetic paper of the present invention is obtained by previously melt-kneading a resin composition for the base material layer (A), extruding the kneaded composition into sheet form, stretching the extruded sheet from 4 to 7 times its original length in the machine direction by utilizing the difference in the circumferential speed of a roll group, then melt-kneading the resin composition (B) of the surface layer, laminating them to at least one surface of the stretched sheet into a sheet-form, then stretching the laminate from 4 to 12 times its original width in the transverse direction using a tenter at a temperature from 5° C. to 35° C. lower than the melting point of the olefinic polymer for the base material layer and at a temperature at least 3° C. higher than the melting point of the polypropylene series copolymer or the high-density polyethylene for the surface layer, then heat-treating, and cooling them.

After stretching, the base material layer is crystal-oriented, the surface layer is melt-oriented and no void forms in the surface layer.

The thickness of the synthetic paper of the present invention is generally from 35 to 300 μm.

Also, for improving the offset printing property of the synthetic paper of the present invention, a corona discharging treatment may be applied to the surface of the uniaxially stretched layer of the surface layer (B) or a water-soluble primer selected from ethyleneimine addition products such as polyethyleneimine, poly(ethyleneimine-urea), polyamine-polyamide, etc.; epichlorohydrin addition products of polyaminepolyamide, etc.; and tertiary of quaternary nitrogen-containing acrylic resins may be coated on the surface of the uniaxially stretched layer (B).

Then, the following examples are intended to illustrate the present invention more practically but not to limit it in any way.

PRODUCTION EXAMPLES OF SYNTHETIC PAPER WITH MULTI-LAYER STRUCTURE

Example 1

(1) A composition (A) obtained by compounding a mixture of 80% by weight of a polypropylene homopolymer having a melt index (MI) of 0.8 g/10 minutes (the melting peak temperature: 164° C.; the melting end temperature: 174° C.) and 8% by weight of a high-density polyethylene with 12% by weight calcium carbonate having a mean particle size of 1.5 μm was melt-kneaded by an extruding machine kept at 270° C., extruded into sheet form from the die thereof, and cooled by cooling rolls to provide an unstretched sheet. After heating the sheet to 140° C., the sheet was stretched 5 times its original length in the machine direction by utilizing the difference in the circumferential speeds of a roll group.

(2) A composition (B) obtained by mixing 53% by weight of an ethylene-propylene random copolymer having an MI of 10.0 g/10 minutes (the melting peak temperature: 140° C.; the melting end temperature: 151° C.; the ethylene content: 2.0% weight), 2% by weight maleic acid-modified propylene homopolymer containing 0.5% by weight maleic acid, and 44.5% by weight calcium carbonate having a mean particle size of 1.5 μm was melt-kneaded by an extruding machine kept at 270° C. Also, a composition (C) obtained by mixing 50% by weight of a propylene homopolymer having an MI of 4.0 g/10 minutes (the melting peak temperature: 164° C.; the melting end temperature: 178° C.) and 50% by weight calcium carbonate having a mean particle size of 1.5 μm was melt-kneaded by an extruding machine kept at 270° C. The melt-kneaded composition (B) and the melt-kneaded composition (C) were supplied into a co-extrusion die. After laminating the melt-kneaded composition (B) and the melt-kneaded composition (C) in the die, the laminated compositions were co-extruded from the die, and the co-extruded sheet thus obtained was laminated on one side of the sheet (A) stretched 5 times that obtained in the above step (1) such that the layer (B) containing the ethylene-propylene random copolymer became the outer side.

Then, similarly extruded compositions (B) and (C) were laminated in another co-extrusion die and coextruded to the opposite side of sheet (A), stretched 5 times and laminated thereon such that layer (B) containing the ethylene-propylene random copolymer became the outer layer.

The surface of the 5 layer laminated film was subjected to a corona discharging treatment to provide a synthetic paper with a 5-layer structure of (B)/(C)/(A)/(C)/(B), where the thickness of each film was 5/25/70/25/5 μm, respectively.

Example 2

The same procedure as in Example 1 was followed, except that a composition composed of 53% by weight high-density polyethylene (the melting peak temperature: 129° C.; the melting end temperature: 136° C.), 2% by weight maleic acid-modified ethylene-vinyl acetate copolymer, and 45% by weight calcium carbonate having a mean particle size of 1.5 μm was used in place of the resin composition (B) for the uniaxially stretched layer, to obtain a synthetic paper of a 5-layer structure.

Example 3

The same procedure as in Example 1 was followed, except that a composition composed of 35% by weight ethylene-propylene random copolymer (the melting peak temperature: 140° C.; the melting end temperature: 151° C.; the ethylene content: 2.0% by weight), 18% by weight propylene homopolymer (the melting peak temperature: 164° C.; the melting end temperature: 174° C.), 2% by weight maleic acid-modified propylene homopolymer, and 45% by weight calcium carbonate having a mean particle size of 1.5 μm was used in place of the resin composition (B) for the uniaxially stretched layer, to obtain a synthetic paper of a 5-layer structure.

Example 4

The same procedure as in Example 1 was followed, except that calcium carbonate having a mean particle size of 0.8 μm was used in place of calcium carbonate having the mean particle size of 1.2 μm in the composition (B) for the uniaxially stretched layer, to obtain a synthetic paper with a 5-layer structure.

Example 5

The same procedure as in Example 1 was followed, except that a composition composed of 53% by weight ethylene-propylene random copolymer having an MI of 4 g/10 minutes (the melting peak temperature: 147° C.; the ethylene content: 1.5% by weight), 2% by weight maleic acid-modified propylene homopolymer having a maleic acid content of 0.5% by weight, and 45% by weight calcium carbonate having a mean particle size of 1.5 μm was used in place of the resin composition (A) for the biaxially stretched layer as the base material layer, to obtain a synthetic paper with a 5-layer structure.

Comparative Example 1

The same procedure as in Example 1 was followed, except that a propylene homopolymer having an MI of 4.0 g/10 minutes (the melting peak temperature: 164° C.; the melting end temperature: 174° C.) was used in place of the ethylene-propylene random copolymer for the composition (B) for the uniaxially stretched layer, to obtain a synthetic paper with a 5-layer structure.

Comparative Example 2

The same procedure as in Example 1 was followed, except that calcium carbonate having a mean particle size of 6 μm was used in place of calcium carbonate having a mean particle of 1.5 μm for composition (B) for the uniaxailly stretched layer, to obtain a synthetic paper with a 5-layer structure.

Comparative Example 3

The same procedure as in Example 1 was followed, except that a composition composed of 26.5% by weight ethylene-propylene random copolymer (the melting peak temperature: 147° C.; the ethylene content: 2.0% by weight), 26.5% by weight propylene homopolymer (the melting peak temperature: 164° C.), 2% by weight maleic acid-modified propylene homopolymer, and 45% by weight calcium carbonate having a mean particle size of 1.5 μm was used in place of composition (B) for the uniaxially stretched layer, to obtain a synthetic paper with a 5-layer structure.

Figure 2:
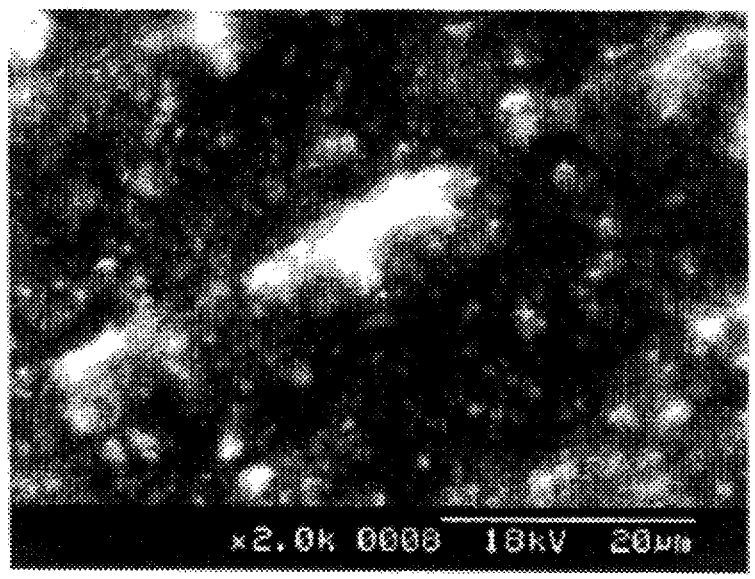
FIG. 2 is an electron micrograph of the surface state of an embodiment of the synthetic paper of the present invention.
Figure 3:
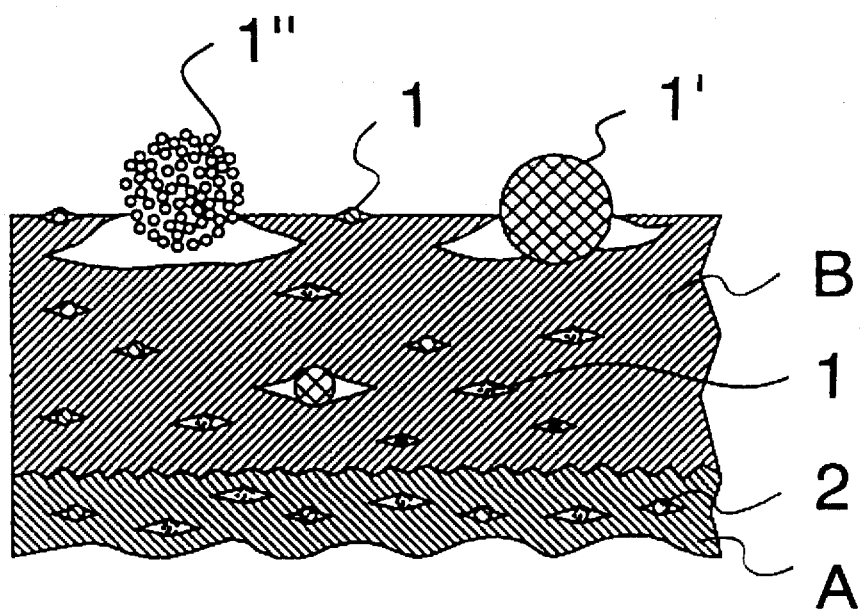
FIG. 3 is a magnified partial cross sectional view of a conventional synthetic paper.
Figure 4:
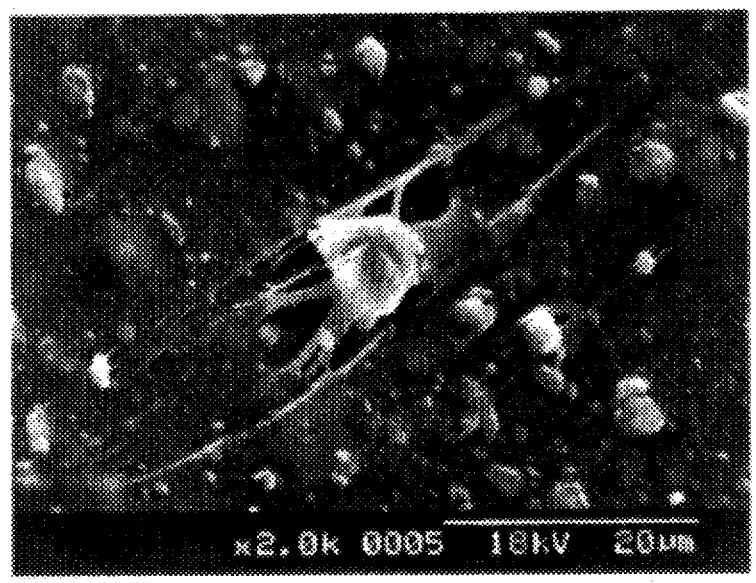
FIG. 4 is an electron micrograph of the surface state of a conventional synthetic paper as described in U.S. Pat. No. 4,318,950.

Evaluation (1) Observation of Resin Coating on Inorganic Fine Powder:

The surface of each synthetic paper obtained in the examples and the comparative examples was observed using an electron microscope (2,000 magnifications) and where the whole surface of the inorganic fine powder in the synthetic paper is coated (see FIG. 1 and FIG. 2) is evaluated as "coated", while where only part of the inorganic fine powder in the synthetic paper is coated (see FIG. 3 and FIG. 4) is evaluated as "uncoated". In FIGS. 1 and 3, A represents a base material layer, B represents a surface layer, 1 and 2 each represents an inorganic fine powder, 1' represents a huge particle, and 1" represents an aggregated macro-particle.

(2) Smoothness: Evaluated by the method of JIS P8119

(3) Surface Roughness: Evaluated by the method of JIS B0602

(4) Gloss: Evaluated by the method of JIS P8142 (Angle: 75°)

(5) Evaluation of Printing Property:

Each of the synthetic papers was printed using a 612CD-Type Printing Machine (manufactured by Hamada Printing Press Co., Ltd.) and using an offset printing ink, Best SP (trade name, made by T & K TOKA Co., Ltd.), dark blue (or indigo) and following term was evaluated.

(5-1) Evaluation of Paper Powder Trouble:

Continuous printing was applied on 1,000 sample sheets and the whiteness of the blanket barrel was visually evaluated.

Evaluation ranks:

5. Not whitened.
4. Scarcely whitened.
3. Whitened a little but the whiteness was not at a level of causing a problem.
2. Whitened to the level of causing a paper powder trouble.
1. Greatly whitened to cause a paper powder trouble.

(5-2) Drying property of offset printing ink:

One thousand (1,000) synthetic papers were continuously printed using a 612CD-type Printing Machine (manufactured by Hamada Printing Press Co., Ltd.) and an offset printing ink, Best SP (trade name, made by T & K TOKA Co., Ltd.), dark blue, the prints were allowed to stand in a piled state, sampling was carried out at a definite time, and the dried state was evaluated.

Evaluation ranks:

5. Very quick
4. Quick
3. Not quick but at a level causing no problems
2. Fairly slow to the extent of causing problems
1. Very slow (5-3) Ink adhesion:

A pressure-sensitive adhesive tape (Cello-Tape, trade name, made by Nichiban Company, Limited) was applied to each print to carry out a peeling test and the extent of the adhesion of the ink was evaluated.

Evaluation ranks:

5. Very strong. No peeling.
4. Strong. Peeling was less than 5/100.
3. Usual. A level of causing no problem (peeling was from 5/100 to 15/100).
2. Weak. Peeling was over 20/100.
1. Very weak. Peeling of the printed surface occurred.

(6) Pencil writing property:

Two straight lines were crosswise (i.e., in the longitudinal direction and the transverse direction) drawn with a pencil (HB (i.e., hard black), #9800, manufactured by Mitsubishi Pencil Co., Ltd.) at a tool force of 200 g on the synthetic paper and the extent of the pencil writing property was evaluated.

Evaluation ranks:

Possible: The lines could be drawn with sufficient density.

Impossible: The lines could not drawn with sufficient density, even when the tool force was increased.

The results obtained are shown in Table 1 below.

TABLE 1

| Sample | (A) | (B) (sec.) | (C) (μm) | (D) (%) | (E) | (F) | (G) | (H) |
|---|---|---|---|---|---|---|---|---|
| 1 | Ctd. | 320 | 0.90 | 14 | 5 | 4 | 5 | Pos. |
| 2 | Ctd. | 285 | 1.10 | 10 | 5 | 4 | 5 | Pos. |
| 3 | Ctd. | 370 | 1.00 | 13 | 4 | 4 | 4 | Pos. |
| 4 | Ctd. | 390 | 0.86 | 19 | 5 | 4 | 5 | Pos. |
| 5 | Ctd. | 305 | 0.95 | 13 | 5 | 4 | 5 | Pos. |
| C-1 | Unctd | 420 | 0.68 | 17 | 1 | 3 | 2 | Pos. |
| C-2 | Unctd | 155 | 1.65 | 10 | 3 | 4 | 4 | Pos. |
| C-3 | Unctd | 330 | 1.05 | 13 | 2 | 3 | 4 | Pos. |

In the above table:
(A): Coated state of inorganic fine powders Ctd: Coated; Unctd: Uncoated.
(B): Smoothness (JIS P8119). Sec.: Seconds
(C): Surface roughness (JIS B0602)
(D): Gloss (JIS-P8142; Angle 75°
(E): Paper powder trouble
(F): Drying property of offset printing ink
(G): Adhesion of offset printing ink
(H): Pencil writing property;. Pos.: Possible,
Sample Nos. 1 to 5: Samples of this invention
Sample Nos. C-1 to C-3: Comparative Samples As shown in the above table, it can be seen that in the synthetic papers of the present invention, the surfaces of the inorganic fine powders contained in the synthetic papers are coated well with the propylene series copolymer or the high-density polyethylene, and the occurrence of the paper powder trouble at offset printing is less. Furthermore, since a proper unevenness is formed on the surface of each synthetic paper, drying of ink dried by an oxidative polymerization is accelerated, and also the occurrence of off setting in the piled state of the printed synthetic papers is prevented.

While the invention has been described in detail and with reference to specific examples thereof, it will be apparent to one skilled in the art that various changes and modifications can be made therein without departing from the spirit and scope thereof.

What is claimed is:

1. A synthetic paper with a multi-layer structure comprising a biaxially stretched film of an olefinic polymer having a melting point from 130° C. to 210° C. as determined from the peak temperature of the Differential Scanning Calorimetry curve containing from 5 to 40% by weight inorganic fine powders having a mean particle size of from 0.01 to 10 μm as a base material layer (A) having adhered to at least one surface thereof a uniaxially stretched layer (B) having a surface roughness Ra of from 0.3 to 1.5 μm, with the uniaxially stretched layer (B) comprising an α-olefin propylene copolymer or a high-density polyethylene having a melting point, the peak temperature of the Differential Scanning Calorimetry curve, of from 120° C. to 160° C. which is at least 5° C. lower than the melting point of the olefinic polymer of the base material layer (A), and from 8 to 65% by weight inorganic fine powders having a mean particle size of from 0.01 to 5 μm, wherein the surfaces of the inorganic fine powders contained in the uniaxially stretched layer (B) are coated with the α-olefin propylene copolymer or the high-density polyethylene, and wherein the surface of the uniaxially stretched layer (B) has a gloss, measured at an angle of 75° of less than 20% and a Bekk Index smoothness of less than 500 seconds.

2. The synthetic paper as claimed in claim 1, wherein the olefinic polymer of layer (A) is a propylene homopolymer having a melting point of from 160° C. to 174° C., a melt index of from 0.5 to 10 g/10 minutes, and a crystallinity of from 35 to 70%.

3. The synthetic paper as claimed in claim 1, wherein the α-olefin propylene copolymer of layer (B) is an ethylene-propylene copolymer.

4. The synthetic paper as claimed in claim 1, wherein the uniaxially stretched layer (B) is from 2 to 60 μm thick and the base material layer (A) is from 20 to 200 μm thick.

5. The synthetic paper as claimed in claim 1, wherein the base material layer (A) has microvoids having a void ratio of from 5 to 55%.

6. The synthetic paper as claimed in claim 1, wherein the inorganic fine powders in the base material layer (A) are present in an amount from 10 to 35% by weight and have a mean particle size of from 0.05 to 8 μm.

7. The synthetic paper as claimed in claim 1, wherein the inorganic fine powders in the surface layer (B) are present in an amount from 15 to 55% by weight and have a mean particle size of from 0.05 to 3 μm.

8. The synthetic paper as claimed in claim 1, further comprising a uniaxially stretched layer (C) of a propylene series resin containing from 8 to 55% by weight of an inorganic fine powder, wherein layer (C) is between layer (A) and layer (B).

9. The synthetic paper as claimed in claim 1, wherein layer (A) further comprises an α-olefin propylene copolymer, a high-density polyethylene, a polystyrene or an ethylene-vinyl acetate copolymer.

* * * * *